United States Patent [19]

Smeulers

[11] Patent Number: 4,821,098
[45] Date of Patent: Apr. 11, 1989

[54] CIRCUIT FOR DERIVING A SYNCHRONIZING SIGNAL CONTAINED IN AN INCOMING VIDEO SIGNAL

[75] Inventor: Wouter Smeulers, Eindhoven, Netherlands

[73] Assignee: U.S. Philips Corporation, New York, N.Y.

[21] Appl. No.: 81,386

[22] Filed: Aug. 3, 1987

Related U.S. Application Data

[63] Continuation of Ser. No. 737,016, May 23, 1985, abandoned.

[30] Foreign Application Priority Data

Jun. 20, 1984 [NL] Netherlands ............... 8401955

[51] Int. Cl.$^4$ ............................... H04N 5/10
[52] U.S. Cl. ..................... 358/153; 358/154
[58] Field of Search ............... 358/153, 150, 155, 148, 358/158, 147; 307/350, 358, 354, 518; 328/139, 115, 154

[56] References Cited

U.S. PATENT DOCUMENTS 4,319,276 3/1982 Cense et al. ............... 358/158
4,358,790 11/1982 Summers ................ 358/147
4,520,393 5/1985 Zwijsen et al. ............ 358/149

FOREIGN PATENT DOCUMENTS 1143241 6/1966 United Kingdom ............... 358/153

Primary Examiner—James J. Groody
Assistant Examiner—David E. Harvey
Attorney, Agent, or Firm—Michael E. Marion

[57] ABSTRACT

A circuit for deriving a synchronizing signal contained in an incoming video signal, having a pulse generator generating the synchronizing signal when the incoming signal reaches a threshold value. This treshold value corresponds to a level located between the peak and reference levels of the incoming signal and is determined with the aid of a keyed integrator, which integrates the video signal during a period of time which at least partly coincides with the occurrence of an incoming line synchronizing pulse and during a period of time after this occurrence, but before the end of the line blanking interval. In the synchronized state of the line synchronizing circuit, the required keying pulses are generated by this line synchronizing circuit; in the non-synchronized state the keying pulses are derived from the delayed output signal of the pulse generator. (FIG. 2).

4 Claims, 1 Drawing Sheet

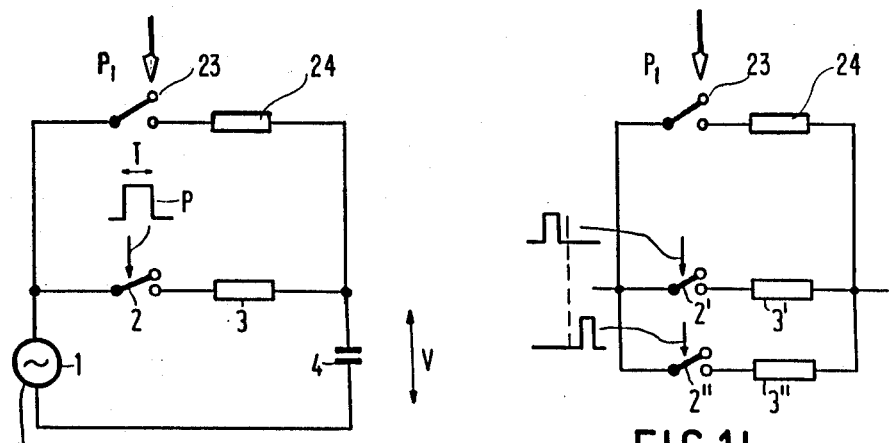
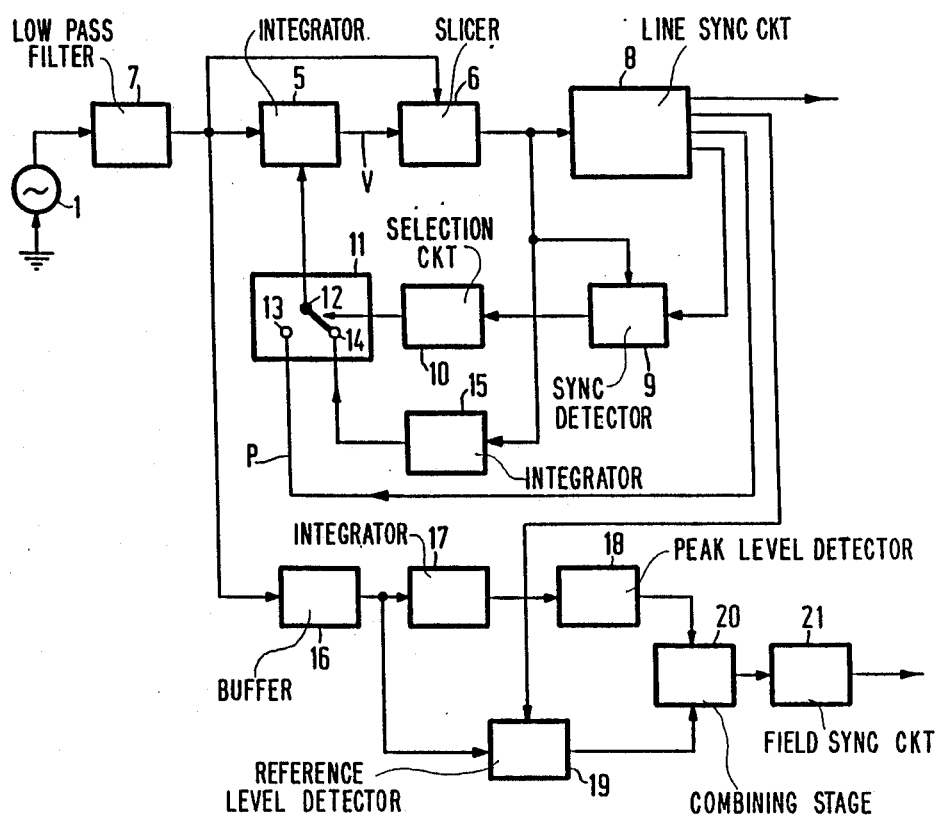

CIRCUIT FOR DERIVING A SYNCHRONIZING SIGNAL CONTAINED IN AN INCOMING VIDEO SIGNAL

This is a continuation of application Ser. No. 737,016, filed May 23, 1985.

BACKGROUND OF THE INVENTION

The invention relates to a circuit for deriving a synchronizing signal contained in an incoming video signal and for applying to a line synchronizing circuit the recovered synchronizing signal, which comprises at least line synchronizing pulses whose amplitude extends between reference and peak levels comprising, connected to a video signal source a pulse generator for generating the synchronizing signal with the aid of a threshold value level generated by a threshold value detector also connected to the video signal source, this threshold value level corresponding to a level located between the peak and reference levels.

Such a circuit is disclosed in the Netherlands Patent Application No. 7000743 (PHN.4560). In this prior art circuit the threshold value level is applied to a slicer, i.e., a bidirectional limiter, for deriving the television synchronizing signal. For this purpose the peak level is determined by means of a peak level detector, whilst the reference level, which is substantially the black level of the video information of the video signal is determined with the aid of a reference level detector. The latter is a keyed detector having a switch which is operated by a suitable keying pulse. The levels thus obtained are thereafter combined for the determination of the threshold value level which is located between, for example half-way, the peak and reference levels. In the event of variations of the amplitude of the incoming synchronizing signal the relative distance of the threshold value level to the peak and reference levels remains fixed.

In the prior art circuit each of the two detectors comprises a storage element constituted by a capacitor. The invention has for its object to provide a circuit of the known type which for the determination of the threshold value level comprises only one storage element. To that end, the circuit according to the invention is characterized in that the threshold value detector is in the form of an integrator for integrating the incoming video signal during the occurrence of a first keying pulse produced during the occurrence of an incoming line synchronizing pulse and a second keying pulse produced after the occurrence of the incoming line synchronizing pulse but before the end of the line blanking interval and for storing the value obtained by this integration operation in a storage element.

If the circuit is constructed with the aid of analog components, the majority of which are included in an integrated circuit, then the circuit comprises only one capacitor so that in the region of the threshold value detector the integrated circuit needs to have only one connecting terminal.

The integration results in a signal which depends on the duration of the second keying pulse compared to the duration of the first keying pulse. If, for example, both periods of time are of equal durations, then the threshold value level obtained is located equidistantly from the peak and reference levels. The invention is based on the recognition that measurements over time are more accurate than level measurments and that they are little influenced by variations of the amplitude, also in the presence of noise, so that also the location of the level obtained varies to a small extent. An additional advantage of the measure according to the invention is that also for a small amplitude of the incoming synchronizing pulses the level obtained is located substantially in the correct position, which has for its result that a controlled amplification for obtaining an incoming signal of an adequately large amplitude can be omitted. Such an amplification is described in, for example, Netherlands Patent Specification No. 169,012.

It should be noted that the Netherlands Patent Application No. 8104533 (PHN.10,166), filed by Applicant describes a circuit similar to the present circuit comprising a peak level detector and a reference level detector which in the synchronized state of the line synchronizing circuit, that is to say in a portion of the time, operate as keyed integrators. Each integrator is supplied with a keying pulse and comprises a storage element.

SUMMARY OF THE INVENTION

The circuit according to the invention comprises only one integrator having one storage element to which two keying pulses are applied and no changeover of the operation occurs.

In addition, the circuit according to the invention is characterized in that in the synchronized state of the line synchronizing circuit the keying pulses are generated by this line synchronizing circuit.

Preferably, the circuit is characterized in that its comprises a delay element for delaying the pulse generated by the pulse generator and for applying in the non-synchronized state of the line synchronizing circuit keying pulses derived from the delayed pulse to the threshold value detector.

A circuit in which the line synchronizing circuit comprises a synchronization detector for establishing the synchronized state of the line synchronizing circuit, is advantageously characterized in that a selection circuit controlled by the synchronization detector is provided for applying the keying pulses to the threshold value detector.

The invention will now be described in greater detail by way of example with reference to the accompanying figures. Herein

DESCRIPTION OF THE DRAWINGS

FIGS. 1a and 1b show a simplified circuit diagram to explain the principle of the invention and FIG. 2 shows a block circuit diagram of a portion of a picture display device, for example a television receiver, which portion comprises the circuit according to the invention.

DESCRIPTION OF THE PREFERRED EMBODIMENT

The principle of the invention is explained in FIG. 1a. Herein reference numeral 1 denotes a video signal source whose video signal is partly shown. This signal comprises a positively-going line synchronizing pulse H, whose ideal form is a rectangle and whose amplitude extends between a reference level and a peak level. In accordance with the majority of television standards, the reference level differs only little from the black level of the video information. This video information has signal values which are negative relative to the reference level, which level is assumed by the signal from source 1 a short period of time prior to and a longer period of time after pulse H. They are the what are commonly denoted as the front and back porches. The period of time between the end of the video information of a given line and the beginning of the video information of the line subsequent thereto is the line blanking interval B.

The signal of source 1 is applied to the series arrangement of a resistor 3 and a capacitor 4 via a controllable switch 2, for example a transistor. Switch 2 is capable of conduction in both directions and is operated by a keying pulse P. In the steady state pulse P has the line frequency and occurs during a time T, which starts simulaneously with the leading edge of pulse H. The duration of pulse P is twice as long as the duration of pulse H. During time T switch 2 conducts. During the first half of time T capacitor 4 is charged via resistor 3 and discharged during the second half of the time T via resistor 3. The trailing edge of pulse P occurs before the end of interval B. After this trailing edge and before the leading edge of the next keying pulse switch 2 is non-conductive. The voltage across capacitor 4 does then substantially not vary. With an adequate choice of the time constant of the RC-network formed by resistor 3 and capacitor 4, the voltage V across capacitor 4 is in the steady state equal to the integral during time T of the signal from source 1. FIG. 1a illustrates that for the ideal waveform of the Figure voltage V has a value which corresponds to a level located halfway between the peak and reference levels, and that for each amplitude of the incoming signal voltage V will have a different value if the duration of pulse P is shorter or longer than twice the duration of pulse H. In this situation the leading edge of pulse P does not need to coincide with the leading edge of pulse H. The only thing necessary is that at least a portion of time T coincides with the duration of pulse H and that a different portion of pulse P occurs after use H, the trailing edge of pulse P not being produced until after the end of interval B.

Switch 2 and resistor 3 may alternatively be replaced, as shown in FIG. 1b, by the parallel arrangement of a controllable switch 2' in series with a resistor 3' and a controllable switch 2" in series with a resistor 3". Switch 2' conducts during the occurrence of a first keying pulse which is present during the occurrence of pulse H, whilst switch 2" conducts during the occurrence of a second keying pulse present after pulse H and before the end of time B. In these circumstances 3' is a charging resistor for capacitor 4, whilst 3" is a discharging resistor. Because of the choice of the charging period, the discharging period and the values of resistors 3' and 3", the desired value can be chosen for voltage V. If, for example, the discharging period is twice the charging period and the value of resistor 3" is twice the value of resistor 3', then with an ideal waveform the level of voltage V is located accurately halfway between the peak and reference levels. It should be noted that the value of voltage V does not depend on the amplitude of the signal of source 1. More specifically, if this amplitude is very small whilst much noise is present, then the level of voltage V is still substantially halfway between the peak and reference levels since voltage V is given by the ratio of two time intervals, which intervals are determined more accurately than amplitudes beset with noise.

During the field blanking interval a plurality of equalization pulses occur which are of a shorter duration than line synchronizing pulses, causing voltage V to become lower. During the occurrence of the field synchronizing pulses voltage V increases and it decreased again during the occurrence of the post-equalization pulses. So a disturbance occurs. After the post-equalizing pulses and prior to the transmission of video information a plurality of normal line synchronizing pulses occur however, and as the value of the time constant of network 3, 4 is equal to some line periods for an adequate smoothing of voltage V, the disturbance has already ended at the end of the field blanking interval. It has been found that this disturbance is of a shorter duration than the disturbance occurring in similar circumstances when deriving, in known manner, of half the sum of the peak and reference values. The disturbance does not occur at all if the supply of the keying pulse(s) is temporarily interrupted.

The keyed integrator of the respective Figures 1a and 1b is denoted by reference numeral 5 in FIG. 2. The threshold value V generated thereby is applied to a splicer 6, to which also the video signal from source 1 is applied. Slicer 6 is of a known structure and comprises a level detector and an amplifier. Slicer 6 generates a pulse having a leading edge which occurs at the instant at which pulse H exceeds the value V and has a trailing edge at the later instant at which pulse H again decreases to below the value V. In this situation it is assumed that the pulse does not have the ideal form shown in FIG. 1a, that is to say that its edge do not occur infinitely fast. This is certainly the case, as a low-pass filter 7 for limiting the bandwidth of the video signal is included between source 1 on the one hand the integrator 5 and slicer 6, respectively on the other hand. This means that the video signal applied to the components 5 and 6 substantially does not comprise chrominance information anymore, whilst the noise superimposed on the signal is integrated to some extent. More specifically, substantially no colour synchronizing signal is present on the back porch.

In the steady state a regenerated synchronizing signal is present at the output of slicer 6 with pulses which coincide to some extent with the line synchronizing pulses H of the incoming signal, although with steeper edges, and with the above-mentioned, slight disturbance during the field blanking interval. The regenerated synchronizing signal is applied to a line synchronizing circuit 8, which in known manner is in the form of a phase control loop for generating a local signal of line-frequency is further processed for the benefit of the horizontal deflection in a picture display tube, not shown. The signal at the output of slicer 6, is also applied to a synchronization detector 9, with the aid of which it is determined in known manner whether the local line signal is in synchronism with the regenerated line synchronizing signal. For that purpose detector 9 also receives a signal generated by a circuit 8 for determining whether coincidence has occurred once or several times during the two line signals applied. Detector 9 generates a signal, for example a positive voltage, if circuit 8 is in the synchronized state and does not generate this signal in the opposite case. As a result, thereof, in the picture display device of which the present circuit forms part different portions are switched in known manner between two states. Such a switching is, for example, that of the time constant of a loop filter present in circuit 8, which causes the insensitivity to noise to be increased in the synchronized state of the phase control loop.

The output of detector 9 is connected to a selection circuit 10, which operates a selection switch 11. By means of circuit 10 the master contact 12 of switch 11 is connected to either a selection contact 13 or a selection contact 14. A fixed connection with the aid of which the keying pulses are applied to the switches 2 or 2', 2", respectively in the integrator 5 for rendering this switch conductive is provided between contact 12 and integrator 5. When line synchronizing circuit 8 is in the synchronized state, selection circuit 10 receives from detector 9 a signal in response to which the contacts 12 and 13 are interconnected. A signal is present on contact 13 which is supplied by circuit 8 and which, as have also the other signals generated by the line oscillator in circuit 8, has the line repetition frequency and is formed by a train of pulses, for example pulses whose leading edges occur always prior to the trailing edges of pulses H and its trailing edges always before the end of time. B. This is the signal P shown in FIG. 1a. As the edges of the different pulses cannot be infinitely steep and because of the fact that the line phase control loop does not have an infinitely large loop gain, it will be obvious that the leading edge of keying pulse P is always delayed with respect to the leading edge of pulse H. In the synchronized state of the loop, the phase of the keying pulse remains substantially fixed relative to the incoming line synchronizing pulse which results in voltage V being substantially constant and consequently that the slice obtained with the aid of slicer 6 always corresponds to the same signal level. In these circumstances slicer 6 applies a reliable synchronizing signal to circuit 8 to synchronize it.

In the non-synchronized state of line synchronizing circuit 8, for example on switch-on of the picture display device or at a temporarily drop-out of the incoming video signal, the keying signal at contact 13 is no longer suitable for use as, when the incoming signal is present again, the keying pulses generally do not have the proper phase relative to the incoming line synchronizing pulses. In said state synchronizing detector 9 does not generate a voltage so that circuit 10 controls switch 11 in such a way that the contacts 12 and 14 are interconnected. Contact 14 is connected to the output of an integrator 15, whose input is connected to the output of slicer 6. By means of integrator 15 integration is effected with a short time constant, so short that the capacitor of the relevant integrating network may be included in the semi-conductor body, all the described components of which, capacitor 4 and the loop filter of circuit 8 excepted, form part. Integrator 15 integrates noise. In addition, it delays the leading edge of the signal from slicer 6. Also the trailing edge is delayed.

At switch-on of the picture display device or when no incoming signal is present, voltage V is zero or is very low. In the incoming video signal this level corresponds to portions of the signal which are high luminance. This is shown by the drawing of the signal in FIG. 1a. From these portions, which can occur at any instant in the line period between the line blanking intervals, slicer 6 derives a signal. So a keying signal, for example the keying signal shown in FIG. 1a or the signal shown in FIG. 1b is applied via integrator 15 and switch 11 to integrator 5 for rendering the switches 2 or 2', 2", respectively conductive, and during the occurrence thereof capacitor 4 is charged and discharged, respectively. Charging is effected during the line blanking interval, whose discharging takes place after the line blanking interval. This causes voltage V to increase. The value of voltage V continues to increase until the level of the synchronizing pulses is reached. Because of the delay produced by integrator 15 the edges of the keying pulse occurs later than the corresponding edges of the incoming line synchronizing pulse, so that the discharging procedure is of a shorter duration than the charging procedure. Voltage V reaches a level above the halfway point between the peak and reference levels. The signal thus obtained at the output of slicer 6 is of the line frequency and is suitable for effecting the synchronization, more specifically until detector 9 causes switch 11 to change-over, whereafter keying pulse P is applied to integrator 5.

The output signal of filter 7 is also applied via a buffer stage 16 to an integrator 17, whose time constant is chosen such that the higher frequency components of the signal are suppressed, but that the field frequency and some harmonics thereof are substantially not affected. In these circumstances the integrated signal produces a peak during a short time at the beginning of the field blanking interval. This peak is measured with the aid of a peak level detector 18. The signal at the output of buffer stage 16 is also applied to a reference level detector 19. Detector 19 has a switch which is operated by a line-frequency keying signal coming from line circuit 8, in such manner that the switch conducts during a number, for example 20, of line periods after the field synchronizing signal, always during a short period of time after the occurrence of the line synchronizing pulse. This occurs of course only after the line phase control loop has been pulled-in, which occurs fast, and after the field synchronizing circuit is in synchronism with the incoming field synchronizing signals. In the non-synchronized state of the field-synchronizing circuit said measure relates to a number of random lines. The peak and reference levels obtained are combined in a combining stage 20 with the aid of which an intermediate level is derived, which is applied as a separate field synchronizing pulse to the field-synchronizing circuit 21. Combining stage 20 may be constructed in a simple way with the aid of a capacitor which is charged by peak level detector 18 and thereafter discharged by reference level detector 19. Circuit 21 is implemented in known manner for generating a local field-frequency signal which is further processed for the vertical deflection in the picture display tube. The field synchronizing signal separator described has the advantage that the field synchronizing signal obtained has a reliable phase relationship. It will, however, be obvious that the field synchronizing signal separator may be of a different, known construction.

It should be noted that the different portions of the circuit of FIG. 2 can be of a known construction and that consequently a more detailed description is not necessary. Slicer 6, for example, may be provided with a comparator state which applies a narrow amplitude slice at the level of the voltage V to an amplifier. In this situation it is not necessary for component 6 to be a bidirectional limiter: the comparator stage may be of such a construction that only the portion between the peak and threshold levels of the video signal is allowed to pass and be amplified. So the clipper thus obtained may be considered to be a pulse generator generating a pulse of a predetermined duration when the incoming signal has reached a predetermined threshold level. Circuit 10 and selection switch 11 may have a first gate with an AND function, to which the output signal of synchronization detector 9 and also the keying pulse P are applied and whose output is connected to an input of a second gate with an OR function. A further input of this second gate is connected to the output of integrator 15 and the keying signal is applied to switch 2 via the output of this gate. From this it will be obvious that when the synchronized state has been detected, pulse P is applied and that in the opposite case the separator output signal, after having been delayed, is applied.

It should also be noted that the described separator requires a given pull-in period before a reliable synchronizing signal is applied to the line synchronizing circit. In the event in which the incoming video signal originates from a picture pick-up and display device this time is however too short. Consequently, in FIGS. 1a and 1b, respectively the series arrangement of a switch 23 and a resisresistor 24 can be arranged in parallel with the respective arrangements 2, 3 or 2′, 3′ and 2″, 3″, said switch being operated by both the keying pulse and a signal P1 which is characteristic of the reception of a signal generated by a picture pick-up and display device, whilst switches 2 or 2′, 2″, respectively are cut off. In this way the time constant of integrator 5 is increased by a factor of 4 to 5.

Finally it should be noted that some of the subcircuits can be replaced by corresponding logic circuits. Thus, it is, for example, possible to construct integrator 5 as a logic integrator with which clock pulses are counted up or down, respectively during a given period of time, the value obtained being stored in a storage element. Also integrator 15 can be replaced by a logic element to obtain the required delay.

I claim:

1. A recovering circuit for recovering a synchronizing signal contained in an incoming video signal and for applying to a line synchronizing circuit comprising a synchronization detector for detecting when the line synchronizing circuit is in a synchronized state, the recovered synchronizing signal, said synchronizing signal having at least line synchronizing pulses having amplitudes extending between a reference level and a peak level, said recovering circuit comprising, coupled to a video signal source for supplying said incoming video signal, a pulse generator for generating the recovered synchronizing signal using a threshold value level generated by a threshold value detector also coupled to the video signal source, said threshold value level corresponding to a level located between the peak and the reference levels, characterized in that said recovering circuit comprises means for deriving a first and a second keying pulse, and the threshold value detector comprises an integrator for integrating the incoming video signal during an occurrence of the first keying pulse, generated during an occurrence of each of said synchronizing pulses, and the second keying pulse, generated after the occurrence of each of said line synchronizing pulses, but before an end of a respective line blanking interval, and for storing the integrated incoming video signal in a storage element, in that said recovering circuit comprises a delay element for delaying pulses in the recovered synchronizing signal generated by the pulse generator and, when the synchronized state is not detected, the first and second keying pulses are derived from the delayed pulses, and in that said recovering circuit comprises a selection circuit controlled by the synchronization detector for applying either the output of the line synchronizing circuit or the output of the delay element to the means for deriving said first and second keying pulses.

2. A recovering circuit for recovering a synchronizing signal contained in an incoming video signal and for applying to a line synchronizing circuit comprising a synchronization detector for detecting when the line synchronizing circuit is in a synchronized state, the recovered synchronizing signal, said synchronizing signal having at least one synchronizing pulses having amplitudes extending between a reference level and a peak level, said recovering circuit comprising, coupled to a video signal source for supplying said incoming video signal, a pulse generator for generating the recovered synchronizing signal using a threshold value level generated by a threshold value detector also coupled to the video signal source, said threshold value level corresponding to a level located between the peak and the reference levels, characterized in that said recovering circuit comprises means for deriving a first and a second keying pulse, and the threshold value detector comprises an integrator for integrating the incoming video signal during an occurrence of the first keying pulse, generated during an occurrence of each of said line synchronizing pulses, and the second keying pulse, generated after the occurrence of each of said line synchronizing pulses, but before an end of a respective line blanking interval, and for storing the integrated incoming video signal in a storage element, said integrator of the threshold value detector comprising a first series arrangement of a first controllable switch and a first resistor and a second series arrangement of a second controllable switch and a second resistor, said first and second series arrangements being in parallel with each other coupled in series with said storage element, said recovering circuit further comprising a delay element for delaying pulses in the recovered synchronizing signal generated by the pulse generator and, when the synchronized state is not detected, the first and second keying pulses are derived from the delayed pulses, and said recovering circuit further comprising a selection circuit controlled by the synchronization detector for applying either to the output of the line synchronizing circuit or the output of the delay element to the means for deriving said first and second keying pulses, said first switch being operated by the first keying pulse for rendering the first switch conductive prior to an occurrence of the trailing edge of each of the line synchronizing pulses and said second switch being operated by the second keying pulse to render the second switch conductive after the occurrence of said trailing edges, and a series arrangement of a further controllable switch and a further resistor arranged in parallel with the series arrangement of the first switch and the first resistor, this further switch being operated by the first and second keying pulses and also by a signal which is generated in response to a signal from a picture pick-up and display device, an integration time constant of a network formed by the further resistor and the storage element being substantially larger than a time constant of a network formed by the first or second resistor, respectively, and the storage element.

3. A recovering circuit for recovering a synchronizing signal contained in an incoming video signal and for applying to a line synchronizing circuit comprising a synchronization detector for detecting when line synchronizing circuit is in a synchronized state, the recovered synchronizing signal, said synchronizing signal having at least line synchronizing pulses having amplitudes extending between a reference level and a peak level, said recovering circuit comprising, coupled to a video signal source for supplying said incoming video signal, a pulse generator for generating the recovered synchronizing signal using a threshold value level generated by a threshold value detector also coupled to the video signal source, said threshold value level corresponding to a level located between the peak and the reference levels, characterized in that said recovering circuit comprises means for deriving a first and a second keying pulse, and the threshold value detector comprises an integrator for integrating the incoming video signal during an occurrence of the first keying pulse, generated during an occurrence of each of said line synchronizing pulses, and the second keying pulse, generated after the occurrence of each of said line synchronizing pulses, but before an end of a respective line blanking interval, and for storing the integrated incoming video signal in a storage element, said integrator of the threshold value detector comprising a series arrangement of a controllable switch, a resistor and a capacitor, said recovering circuit further comprising a delay element for delaying pulses in the recovered synchronizing signal generated by the pulse generator and, when the synchronized state is not detected, the first and second keying pulses are derived from the delayed pulses, and said recovering circuit further comprising a selection circuit controlled by the synchronization detector for applying either to the output of the line synchronizing circuit or the output of the delay element to the means for deriving said first and second keying pulses, and a series arrangement of a further controllable switch and a further resistor arranged in parallel with the series arrangement of the controllable switch and the resistor, this further switch being operated by the first and second keying pulses and also by a signal which is generated in response to signal from a picture pick-up and display device, an integration time constant of a network formed by the further resistor and the capacitor being substantially larger than a time constant of a network formed by the resistor and the capacitor.

4. A recovering circuit as claimed in any one of claim 1, characterized in that a trailing edge of the first keying pulse coincides with a leading edge of the second keying pulse.

* * * * *